US009213221B2

(12) United States Patent
Aiello et al.

(10) Patent No.: US 9,213,221 B2
(45) Date of Patent: Dec. 15, 2015

(54) QUICK SWAP CAMERA MOUNT SYSTEMS

(71) Applicant: Panavision International L.P., Woodland Hills, CA (US)

(72) Inventors: Dominick Aiello, Oak Park, CA (US); Haluki Sadahiro, Oak Park, CA (US)

(73) Assignee: Panavision International, L.P., Woodland Hills, CA (US)

( * ) Notice: Subject to any disclaimer, the term of this patent is extended or adjusted under 35 U.S.C. 154(b) by 0 days.

(21) Appl. No.: 14/085,891

(22) Filed: Nov. 21, 2013

(65) Prior Publication Data

US 2014/0233934 A1 Aug. 21, 2014

Related U.S. Application Data

(60) Provisional application No. 61/767,445, filed on Feb. 21, 2013.

(51) Int. Cl.
*G03B 17/56* (2006.01)
*F16M 11/04* (2006.01)
*F16M 13/04* (2006.01)

(52) U.S. Cl.
CPC ........... *G03B 17/561* (2013.01); *F16M 11/041* (2013.01); *F16M 13/04* (2013.01)

(58) Field of Classification Search
CPC .................................................. G03B 17/561
USPC ................. 396/419, 428; 352/243; 248/187.1
See application file for complete search history.

(56) References Cited

U.S. PATENT DOCUMENTS

| 3,612,462 A | 10/1971 | Mooney et al. |
| 4,474,439 A * | 10/1984 | Brown ......................... 352/243 |
| 4,653,709 A * | 3/1987 | Paldino ..................... 248/183.2 |
| 5,429,332 A * | 7/1995 | Ishikawa .................... 248/187.1 |
| 5,737,657 A * | 4/1998 | Paddock et al. ............... 396/428 |
| 6,196,504 B1 * | 3/2001 | Lemke ....................... 248/187.1 |
| 8,256,726 B2 * | 9/2012 | Bordignon ................ 248/187.1 |
| 2011/0142436 A1 | 6/2011 | Eynav |

FOREIGN PATENT DOCUMENTS

DE 3217122 A1 11/1983
JP 2009138920 A 6/2009

* cited by examiner

*Primary Examiner* — W B Perkey
(74) *Attorney, Agent, or Firm* — Panitch Schwarze Belisario & Nadel LLP

(57) ABSTRACT

Camera mount systems, allowing a camera crew to quickly change over from one type of camera mount to another type of camera mount, include an adapter plate and a camera mounting plate, which can mount to various types of camera mounts. The adapter plate includes a support platform and primary and secondary female alignment elements, which form sockets. The sockets are configured to receive primary and secondary male alignment elements of the camera mounting plate. The camera mounting plate and the adapter plate are configured to mate, using one or more locking, engagement, and/or catch mechanisms such that the mounting plate is securely positioned on the adapter plate. Upon assembly of a camera mount system with a camera mount, movement of the camera during and between filming is avoided.

15 Claims, 13 Drawing Sheets

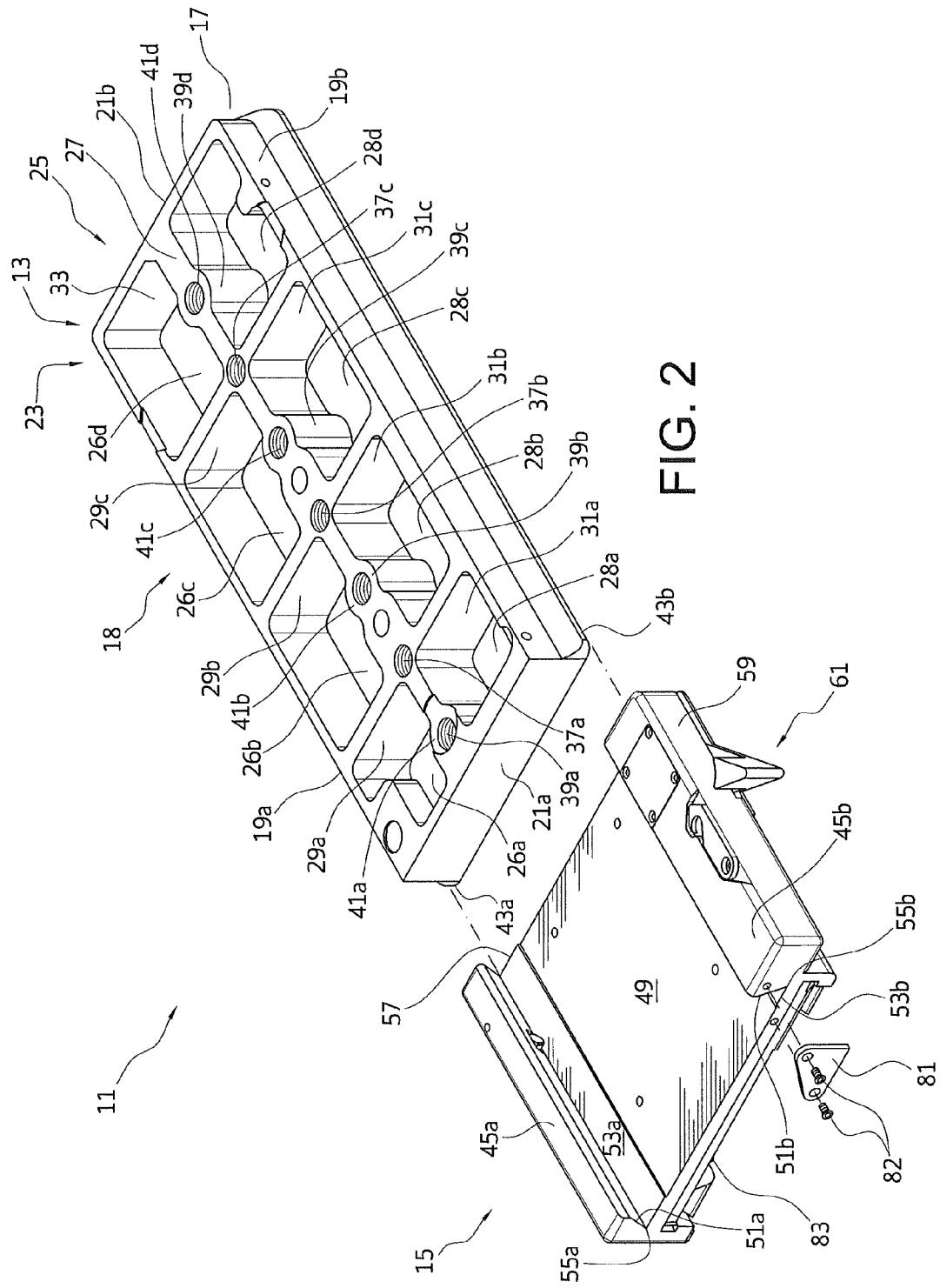

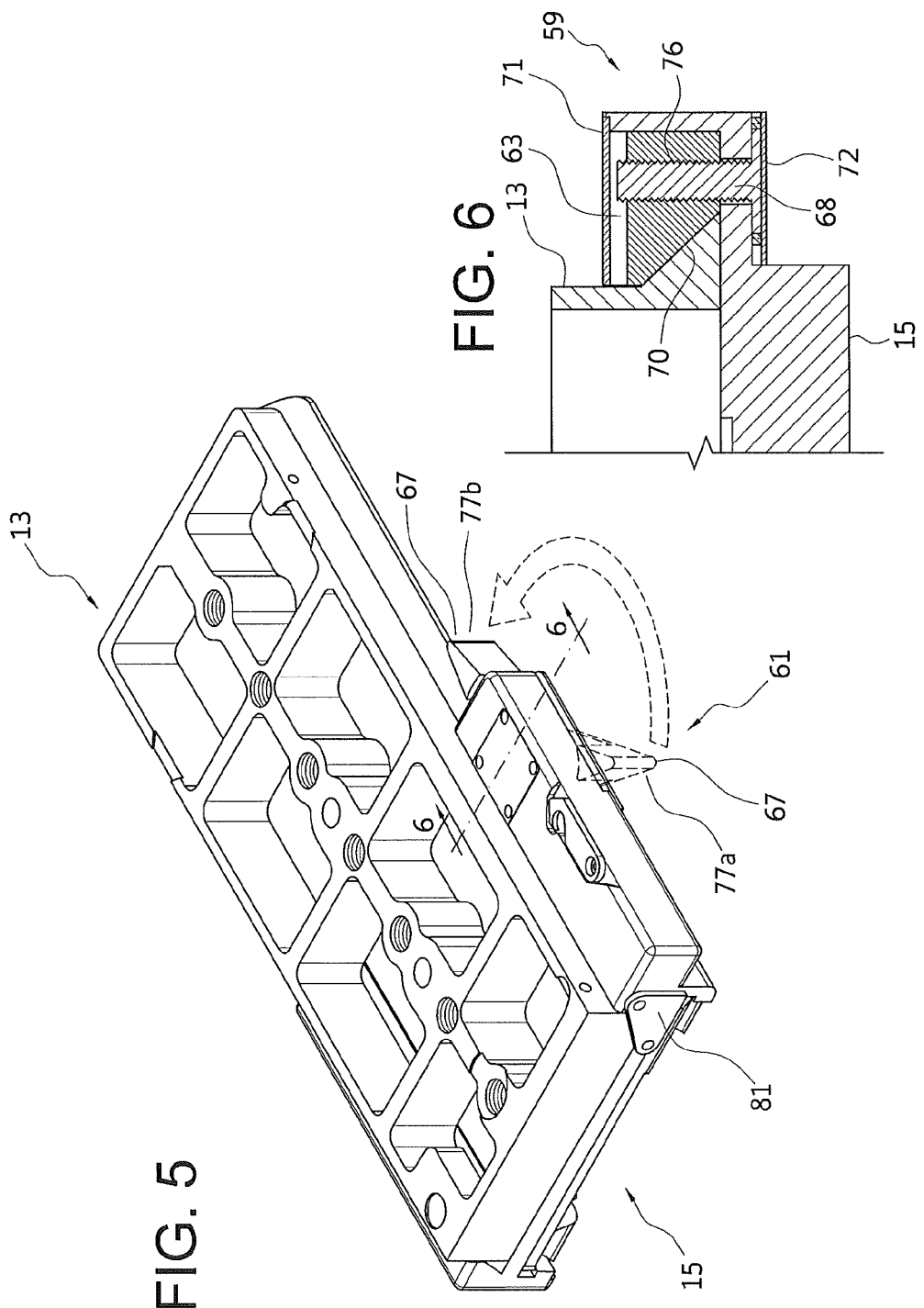

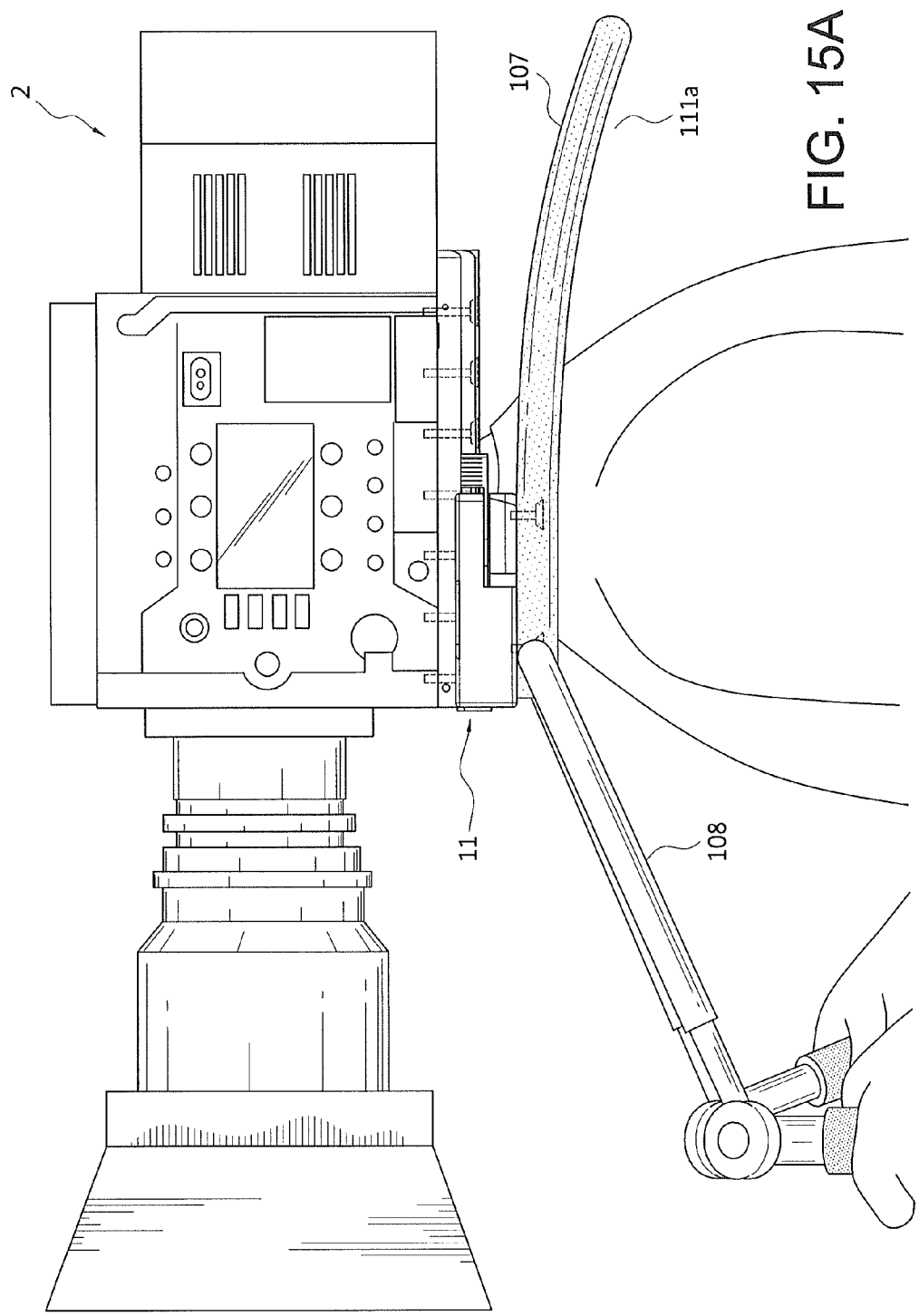

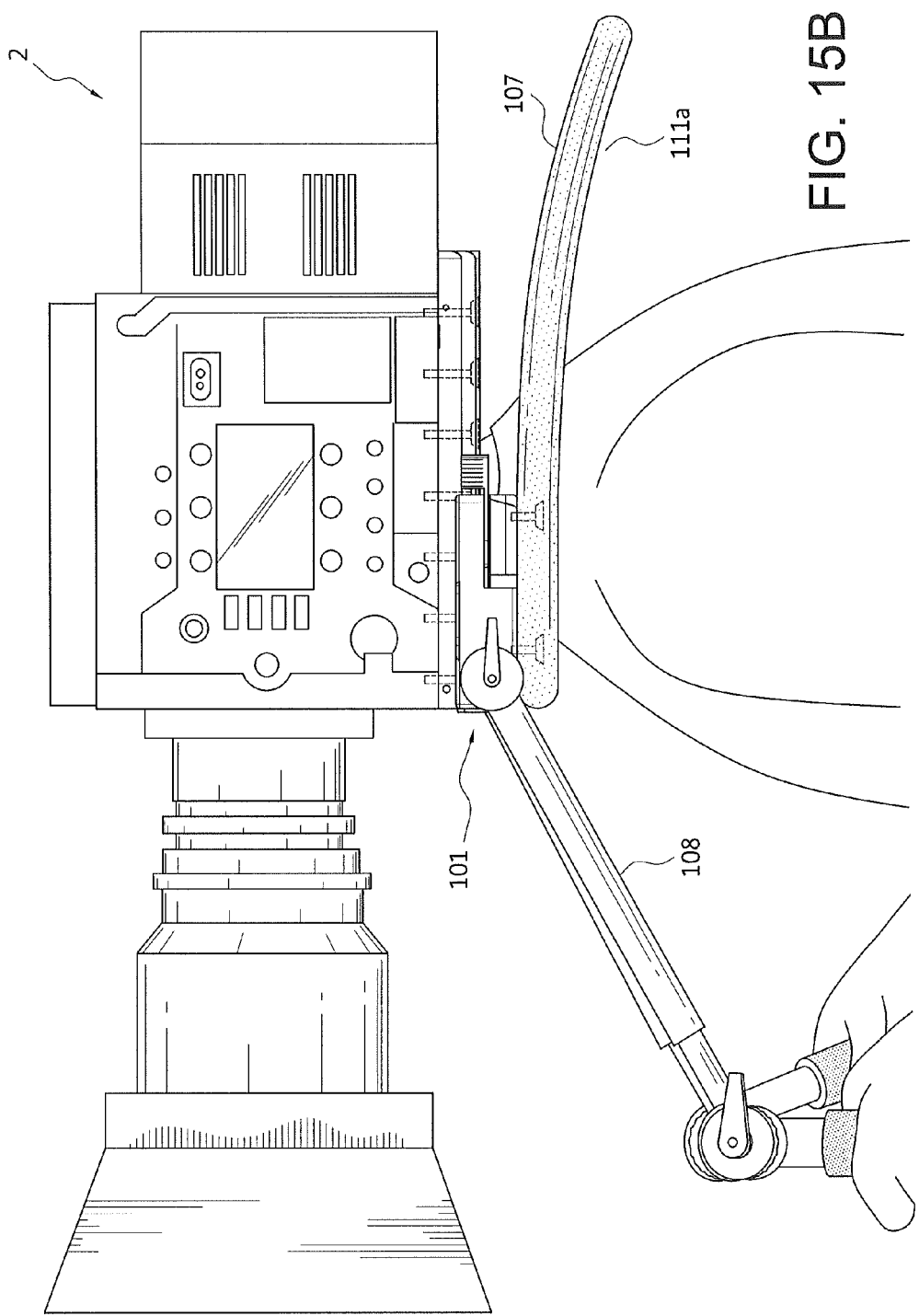

QUICK SWAP CAMERA MOUNT SYSTEMS

CROSS-REFERENCE TO RELATED APPLICATION

This application claims priority to U.S. Patent Application Ser. No. 61/767,445, filed Feb. 21, 2013. The aforementioned priority application is incorporated herein by reference in its entirety.

BACKGROUND

1. Field of the Invention

The field of the present invention is camera mount systems, and particularly camera mount systems that permit a camera to be quickly and easily transferred between different types of camera mounts.

2. Background

Presently, there are many different types of camera mounts onto which a camera may be secured. These range from body-mounted camera stabilizing systems (such as the STEADICAM® line of camera stabilizing systems, sold by The Tiffen Company of Hauppauge, N.Y., and competing systems sold by Xtended Camera Support Inc. of Thousand Oaks, Calif. and GPI Pro Systems of Valencia, Calif.) (collectively hereinafter, body-mounted camera stabilizing systems are referred to as "Steadicam systems"), to various studio mounts (tripod, dolly, crane, etc.) (collectively hereinafter, "studio mounts"), to handheld mounts. Switching between these different types of camera mounts is usually a source of delay during filming. It can easily take several minutes to disconnect a camera from one mount and then reconnect the camera to another mount, depending, in part, upon mount types and fasteners used.

For example, when changing over a STEADICAM® camera stabilizing system to a studio mount, the camera is first removed from the Steadicam system. Then, the system's mounting plate is removed from the underside of the camera. Next, the mounting plate for the studio mount is affixed to the camera. Not until this step is the camera securely placed onto a studio mount.

Generally, mounting plates for Steadicam systems and studio mounts are affixed to the camera by multiple screws which ensure secure attachment of the camera to the camera mount. Tightening of screws during changeovers take time, however, even when changeovers go smoothly. Unfortunately, in many instances changeovers do not go smoothly. Among other mishaps, screws frequently bind and/or strip and parts and tools become misplaced. Such delays easily run up the cost of filming. While camera crews are working diligently to change over camera mounts, others on set are often left standing around until the changeover is complete. A system that enables the camera crew to quickly change over from one type of camera mount to another is desirable.

SUMMARY OF THE INVENTION

The present invention is directed towards camera mounts systems that allow a camera crew to quickly change over from one type of camera mount to another type of camera mount. These systems include, among other elements, an adapter plate and a camera mounting plate, which can mount to various types of camera mounts. The adapter plate includes a support platform and primary and secondary female alignment elements, which form sockets. The sockets are configured to receive primary and secondary male alignment elements of the camera mounting plate. The camera mounting plate and the adapter plate are configured to mate, using one or more locking, engagement, and/or catch mechanisms such that the mounting plate is securely positioned on the adapter plate.

BRIEF DESCRIPTION OF THE DRAWINGS

The drawings described herein are for illustrative purposes only and not intended to limit the scope of the present disclosure. In the drawings, wherein like reference numerals may refer to similar components:

FIG. 2 shows an exploded perspective view of elements in a first configuration of a quick swap camera mount system.

FIG. 5 shows a perspective view of assembled elements in the quick swap camera mount system shown in FIG. 2.

FIG. 6 shows a cross-sectional view taken along line 6-6 shown in FIG. 5.

FIGS. 15A and 15B show side views of quick swap camera mount system configurations coupled to a handheld mount.

DETAILED DESCRIPTION

Figure 1:
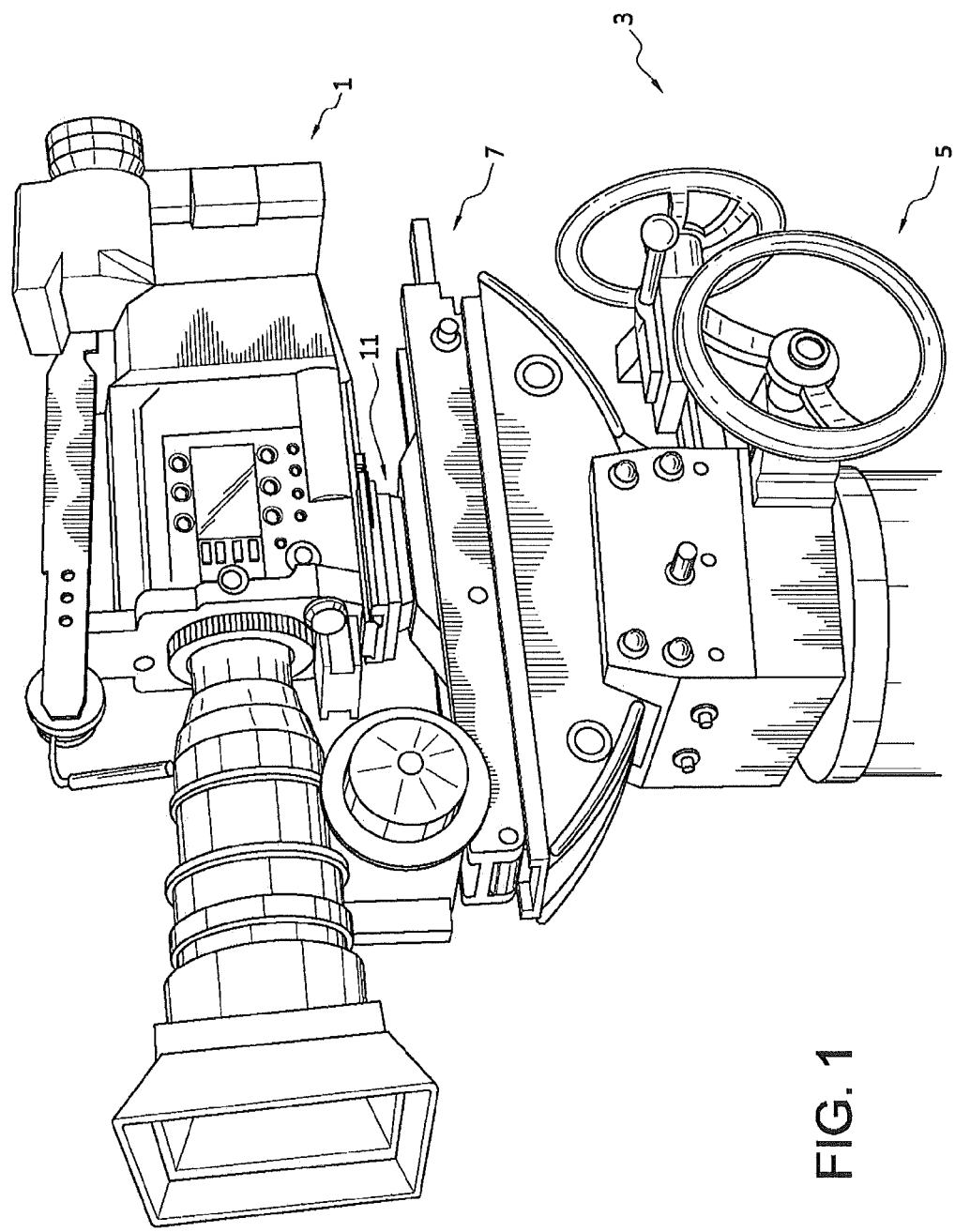
FIG. 1 shows a perspective view of a quick swap camera mount system coupled to a camera and a studio mount.

FIG. 1 shows a perspective view of an assembled camera mount system 11 mounted to a camera 1 and a studio mount 3. The camera configuration shown, however, should not be construed as limiting; the camera mount systems described herein may be mounted onto cameras of various types. The studio mount 3 includes controls 5 for camera positioning and a mountable interface 7, among other elements. The mount configuration shown, however, should also not be construed as limiting. The system 11 may be mounted onto any camera mount, which includes elements which allow coupling of the camera mount systems disclosed herein and quick swapping or changeovers from one mount type to one or more subsequent camera mount types.

Figure 3:
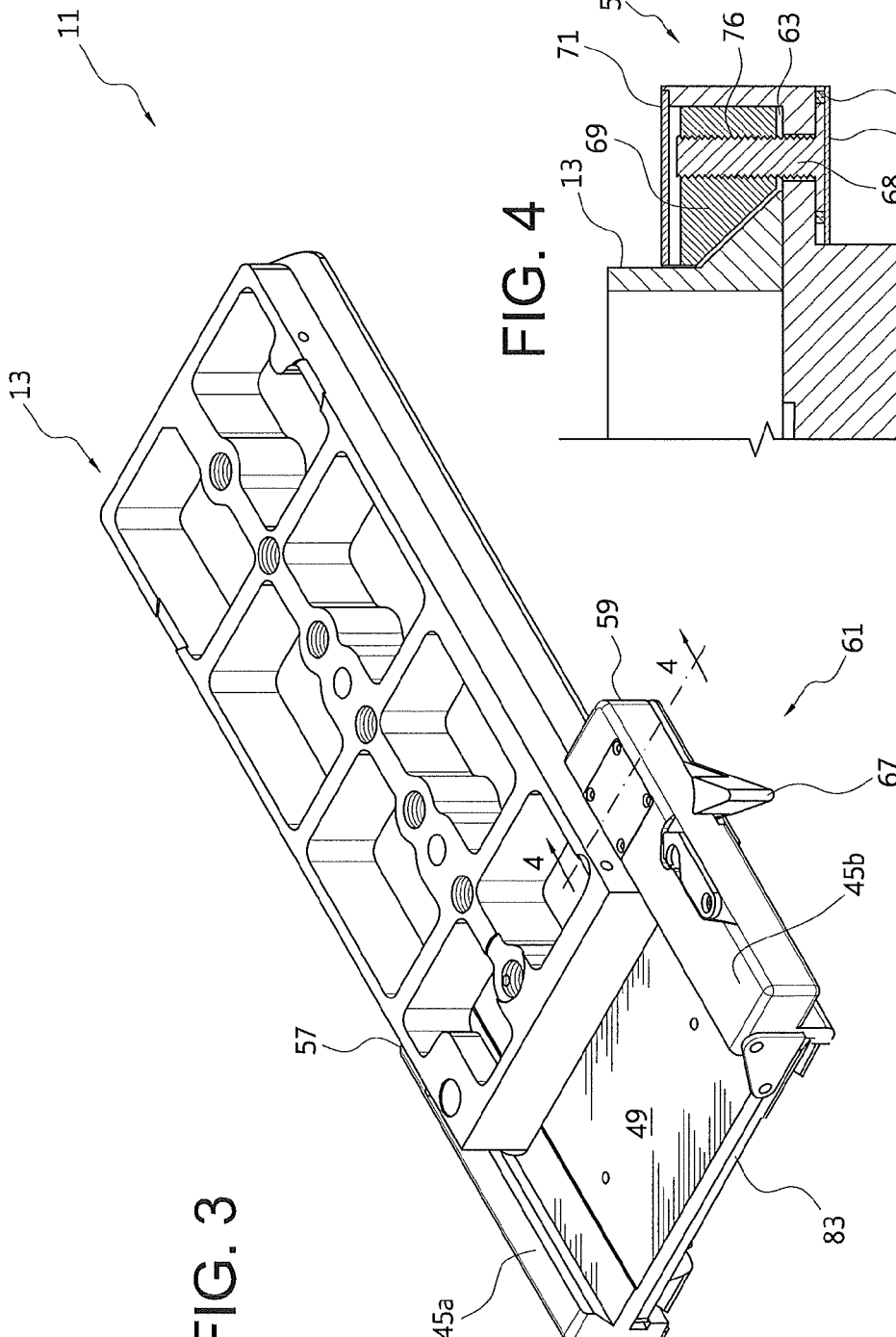
FIG. 3 shows a perspective view of partially assembled elements in the quick swap camera mount system shown in FIG. 2.

FIG. 2 shows an exploded perspective view of the camera mount system 11, while FIGS. 3 and 5 show the camera mount system at various stages of assembly. This configuration of the system 11 includes a camera mounting plate 13 and an adapter plate 15. The camera mounting plate 13 has an outer body portion 17, including a plurality of sides 18. In this version of the mounting plate 13, the outer body portion includes four sides—long sides 19a, 19b and short sides 21a, 21b, and an inner body portion 23. The inner body portion 23 has a plurality of quadrants 25, which each quadrant including an opening 26a, 26b, 26c, 26c, 28a, 28b, 28c, 28d for weight reduction purposes. This configuration of the camera mounting plate includes eight quadrants. Fewer or more quadrants, however, may be provided.

Each quadrant is separated by a central connection strip 27 positioned centrally with respect to long sides 19a, 19b. Positioned between the central connection strip 27 and long sides 19a, 19b are lateral structural elements 29a, 29b, 29c, 31a, 31b, 31c. The central connection strip 27 includes a plurality of bores 33 with each bore having threads for coupling with fasteners and mounting with a camera. Juncture bores 37a, 37b, 37c are included at each intersection of lateral structural elements with the central connection strip. The central connection strip 27 also includes intermediate bores 39a, 39b, 39c, 39d each with an enlarged surrounding wall 41a, 41b, 41c, 41d.

Coupled to long sides 19a, 19b, respectively, are a primary male alignment element 43a, and a secondary male alignment element 43b. These male alignment elements engage with female alignment elements 45a, 45b on the adapter plate 15. Preferably, a male alignment element is configured as a dovetail 47a, 47b such as industry standard dovetails, e.g. Steadicam dovetail. A Steadicam dovetail has a width which is standard industry. A male alignment element is also preferably positioned on a lower portion of a long side 19a, 19b in accordance with industry standards. This positioning and configuration, however, should not be construed as limiting. One or more male alignment elements may have alternative positioning and configurations, depending, in part, on the structural configuration needed to support a particular camera style.

Referring particularly to FIGS. 2 and 3, the adapter plate 15 includes a primary female alignment element 45a, a secondary female alignment element 45b, which are both coupled to and disposed above a support platform 49. A profiled surface 51a of the primary female alignment element 45a and a top surface 53a of the support platform form a primary socket 55a. The primary socket 55a has as a complementary shape to receive the male alignment element 43b of the mounting plate 13.

Similarly, a profiled surface 51b of the secondary female alignment element 45b and a top surface 53b of the support platform form a secondary socket 55b. The secondary socket 55b also has as a complementary shape to receive female alignment element 43b of the mounting plate 13. The mounting plate 13 slides into a first end 57 of the adapter plate 15, with the dovetails 47a, 47b fitting into sockets 55a, 55b. Together, the female and male alignment elements enable the mounting plate 13 to slide into adapter plate 15 and form mating configurations of the system, as shown particularly in FIGS. 3 and 5.

Referring particularly to FIGS. 3-6, a locking section 59 disposed within the secondary female engagement element 45b includes a locking mechanism 61 fitted partially within a cavity 63. The locking mechanism 61 includes a lever 67 which actuates a block 69. The cavity 63 is preferably covered by an upper cover plate 71.

Figure 4:
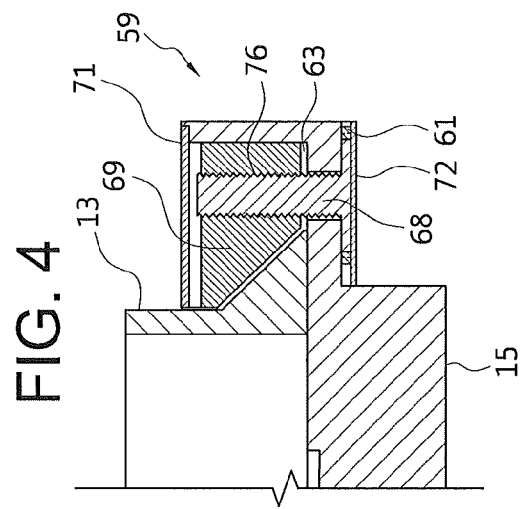
FIG. 4 shows a cross-sectional view taken along line 4-4 shown in FIG. 3.

The lever 67 is coupled to a rotary element 76 positioned within an elongated hole of the block 69, as shown in FIG. 4. The rotary element 76 acts an axle, by engaging both the lever 67 and the block 69. The rotary element 76 76 s integrally engaged within the block 69 such that that the rotary element rotates and pushes the block 69 toward the primary socket 55a, when a force is applied to move the lever from a first position 77a to a second position 77b, as shown in FIG. 5. A lower cover plate 72 may also be positioned adjacent the rotary element 69

When the lever is activated, rotary element 76 turns, as indicated by the curved arrow, shown in FIG. 6, and the block moves downwardly and inwardly toward the mounting plate 13, allowing a maximum amount of surface area of the block 69 to be placed in engagement with the mounting plate 13. This movement causes an interference fit 70 between the block 69 and the mounting plate 13, as shown in FIG. 6.

This interference fit 70 is such that upon full activation of the lever, the mounting plate 13 is unable to move while engaged with the adapter plate 15. FIG. 3 shows the lever 67 when it is deactivated and FIG. 5 shows how the lever in may be positioned while in an activated state and a deactivated state. The block 69 includes an elongated hole 73 through which the rotary element 76 passes, thereby enabling the block to slide toward and away from the socket 55 a as the lever 67 is rotated between a first, open position (shown in FIGS. 2 and 3) to a second, locked position (shown in FIG. 5). The locking mechanism 35 engages the mounting plate 13 when it is in mating engagement with the adapter plate 15 so that the mounting plate is prevented from sliding out of the adapter plate 15, thereby avoiding movement of the camera during and between filming.

An end plate 81 is affixed, using end plate fasteners 82 (FIG. 2), to an opposite end 83 of the adapter plate 15, partially over the end of the primary socket 55a. This prevents the mounting plate 13 from sliding beyond the opposite end 83. The end plate 81 may be replaced with any other type of physical stop which prevents the mounting plate 13 from sliding past the opposite end 81.

Figures 7, 8:
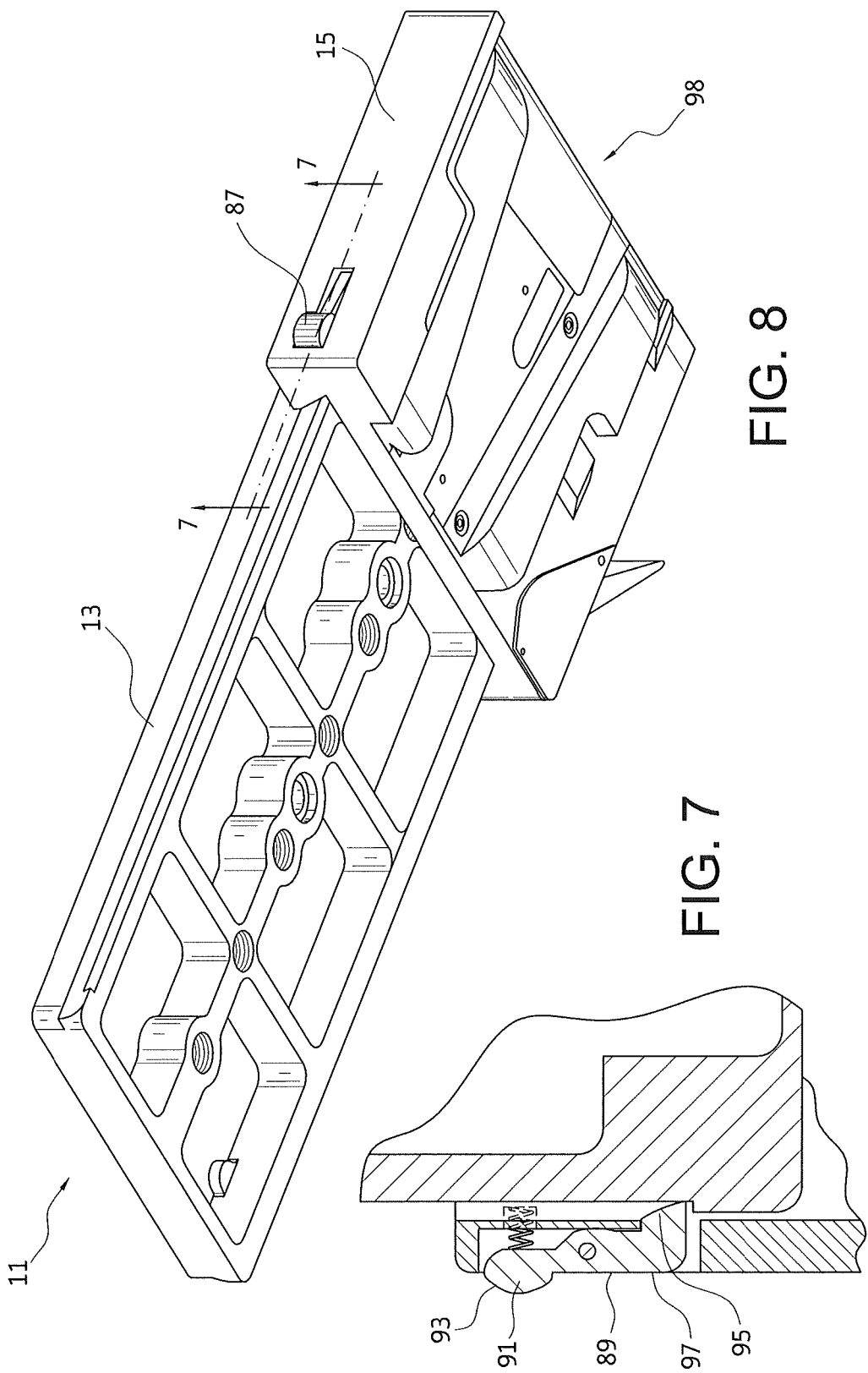
FIG. 7 shows a cross-sectional view taken along line 7-7 shown in FIG. 8.
FIG. 8 shows a bottom side perspective view of a quick swap camera mount system.

FIG. 8 shows a bottom side perspective view of the quick swap camera mount system 11. This view shows how the primary female alignment element 45a mates with the primary male alignment element 43a. In this system configuration, the primary female engagement element includes a cavity 85, having a lateral engagement element 87 disposed therein, as shown particularly in FIG. 7. The lateral engagement element has an elongated body 89 with a push element 91 at a first end 93 and a protruding element 95 at a second end 97. The protruding element is configured for engagement with the mounting plate 13. The lateral engagement element is configured to pivot about a pin 94 and coupled to a spring element 96 for additional alignment of the mounting plate 13 and the adapter plate 15. The lateral engagement element acts as a safety element that prevents a male engagement element from sliding off when a user forgets to activate the lever. Specifically, a cutout portion on the male engagement element of the mounting plate allows the protruding element 95 to slide and prevents the mounting plate from sliding off. The cutout configuration included on the male engagement element is preferable consistent with standards of a Steadicam dovetail. This standard is known for allowing the male engagement element to engage with the female engagement element and then slide off and engage to an off-the-shelf Steadicam stabilizing system with ease.

Figure 13:
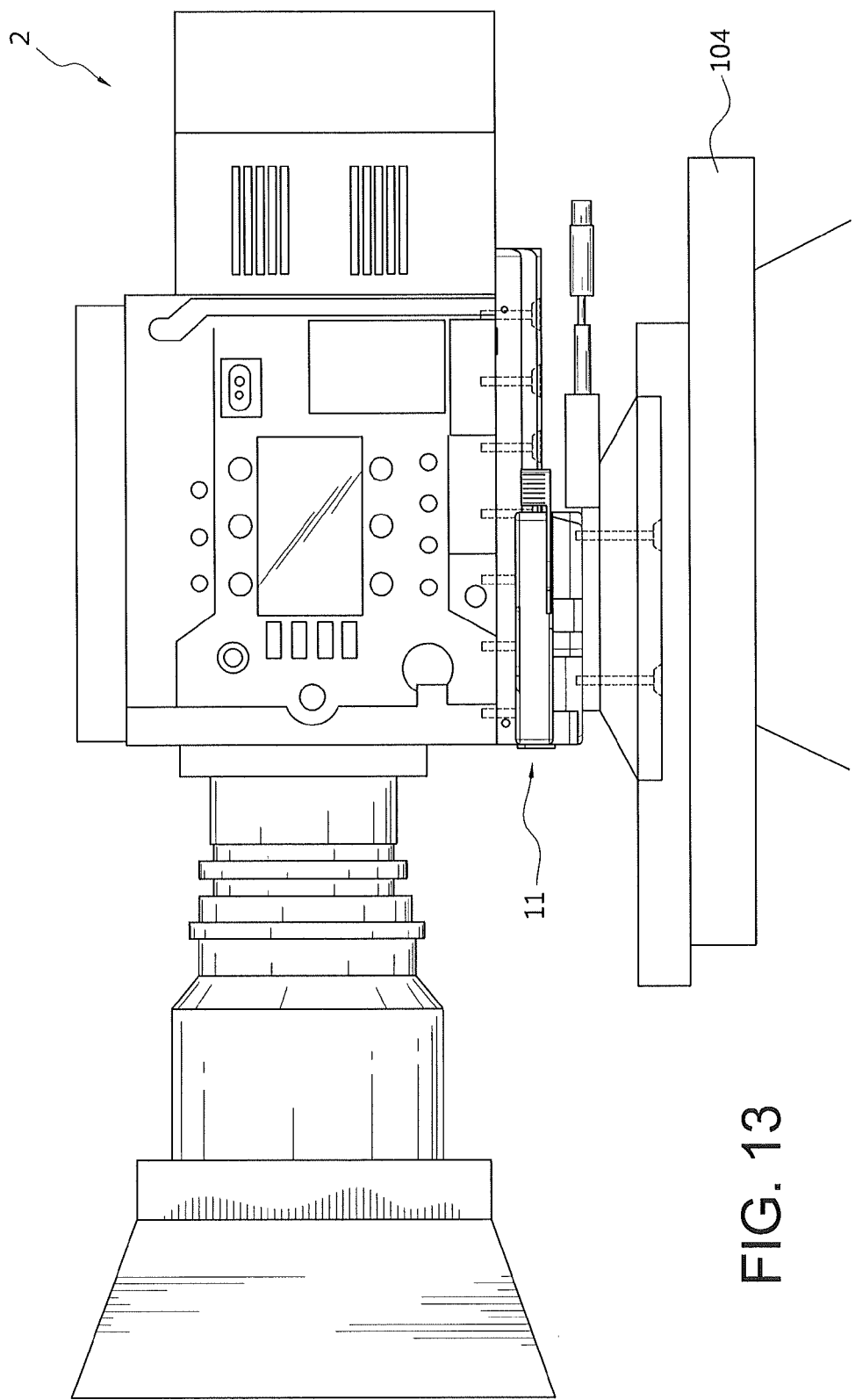
FIG. 13 shows a side view of a quick swap camera mount system coupled to a studio mount.
Figure 14:
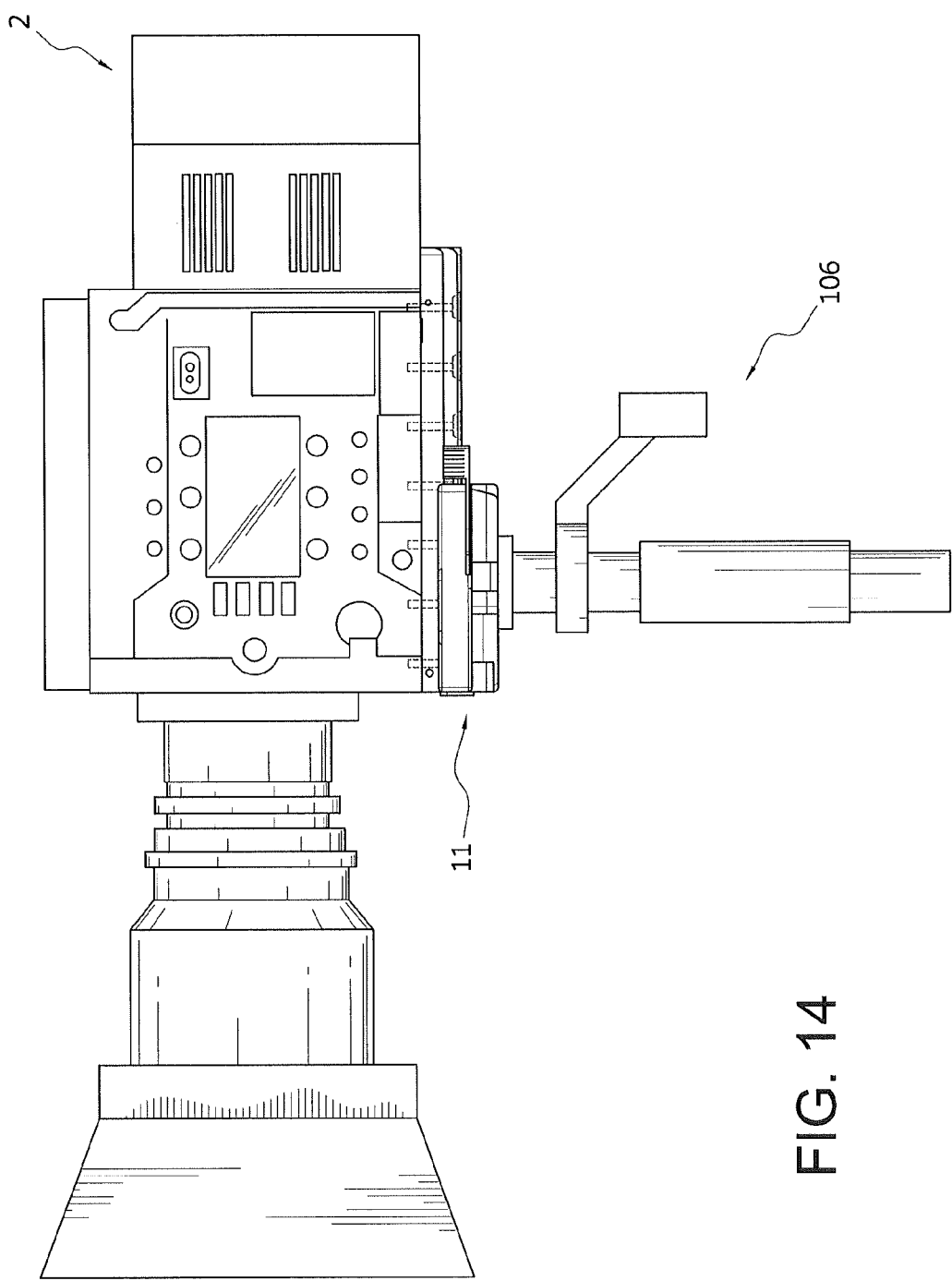
FIG. 14 shows a side view of a quick swap camera mount system coupled to a Steadicam system mount.

Referring back to FIG. 8, a bottom side 16 of the adapter plate 15 includes engagement elements 98, which are configured to mount to a various types of camera mounts. Such mounts are well known to those of skill in the art, and thus the configuration of the bottom side of the adapter plate 15 is not further discussed herein. Camera mounts are available from sources such as Panavision, Inc. of Woodland Hills, Calif. (e.g., the Panahead model), Vitec Videocom Inc. of Burbank, Calif. (e.g. the Sachtler line of fluid head models and the O'Connor line of fluid head models and tripod models), Cartoni S.p.A. of Rome, Italy (e.g., the Sigma model), among many others. The configuration of the bottom side 16 of the adapter plate 15 is therefore configured for complementary engagement with the camera mount with which use is intended. FIG. 13 shows a side view of the system 11 coupled to a camera 2 and to one type of studio mount 104. FIG. 14 shows a side view of the system 11 coupled to a camera 2 and one type of Steadicam mount 106. And, FIG. 15A shows a side view of the system 11 coupled to a camera 2 and to two types of handheld mount 111*a*, 111*b*.

Figure 9:
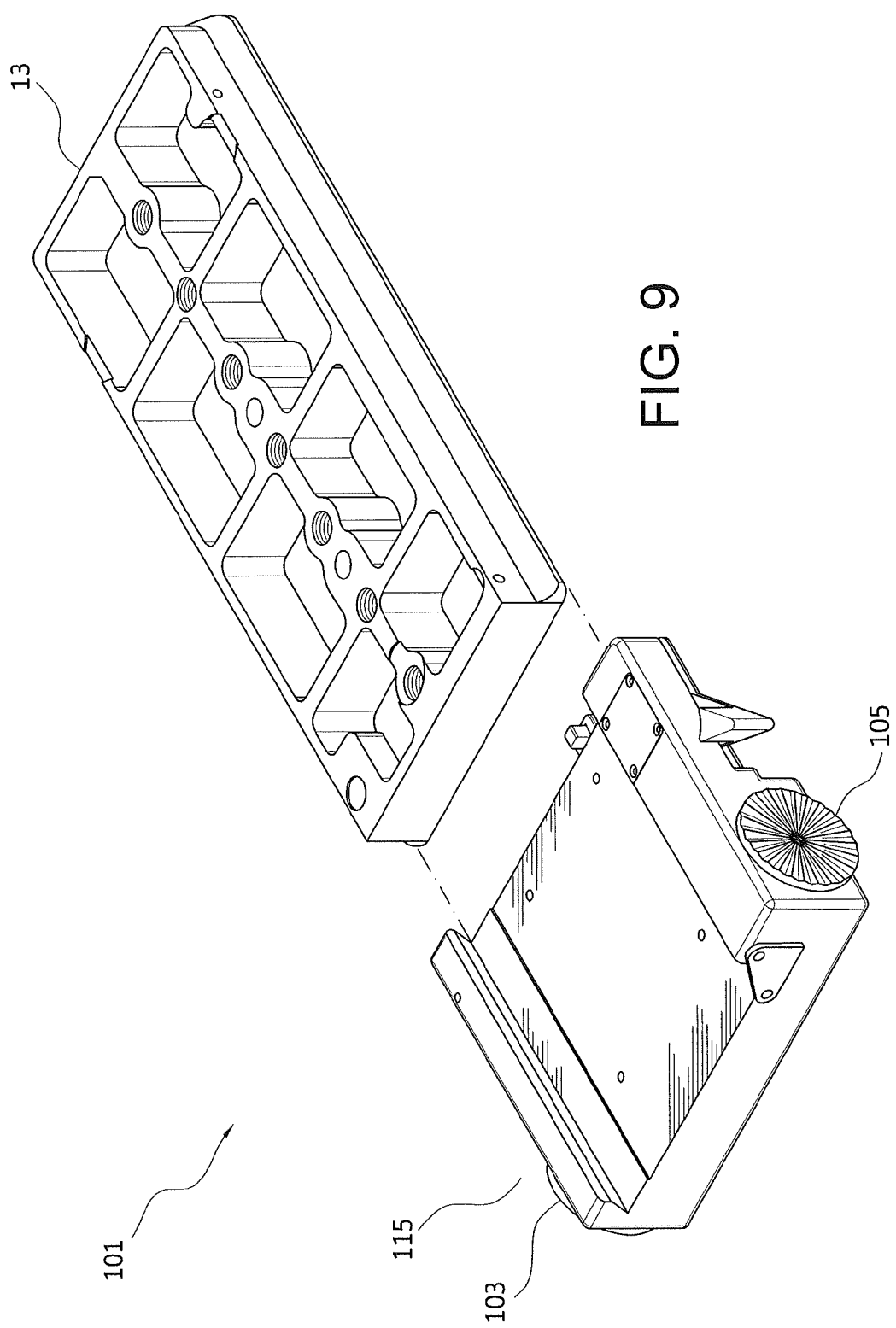
FIG. 9 shows an exploded side perspective view of elements in a second configuration of a quick swap camera mount system.
Figure 10:
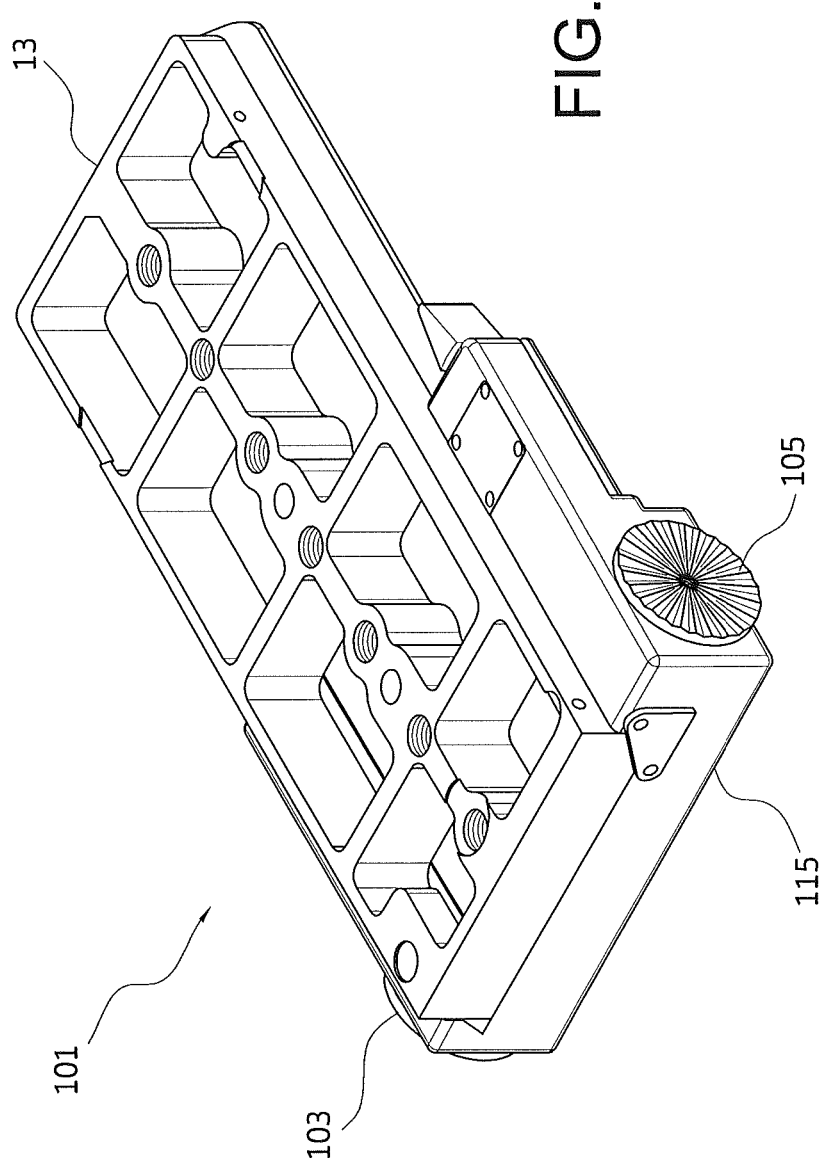
FIG. 10 shows a perspective view of assembled elements in the quick swap camera mount system shown in FIG. 9.
Figure 11:
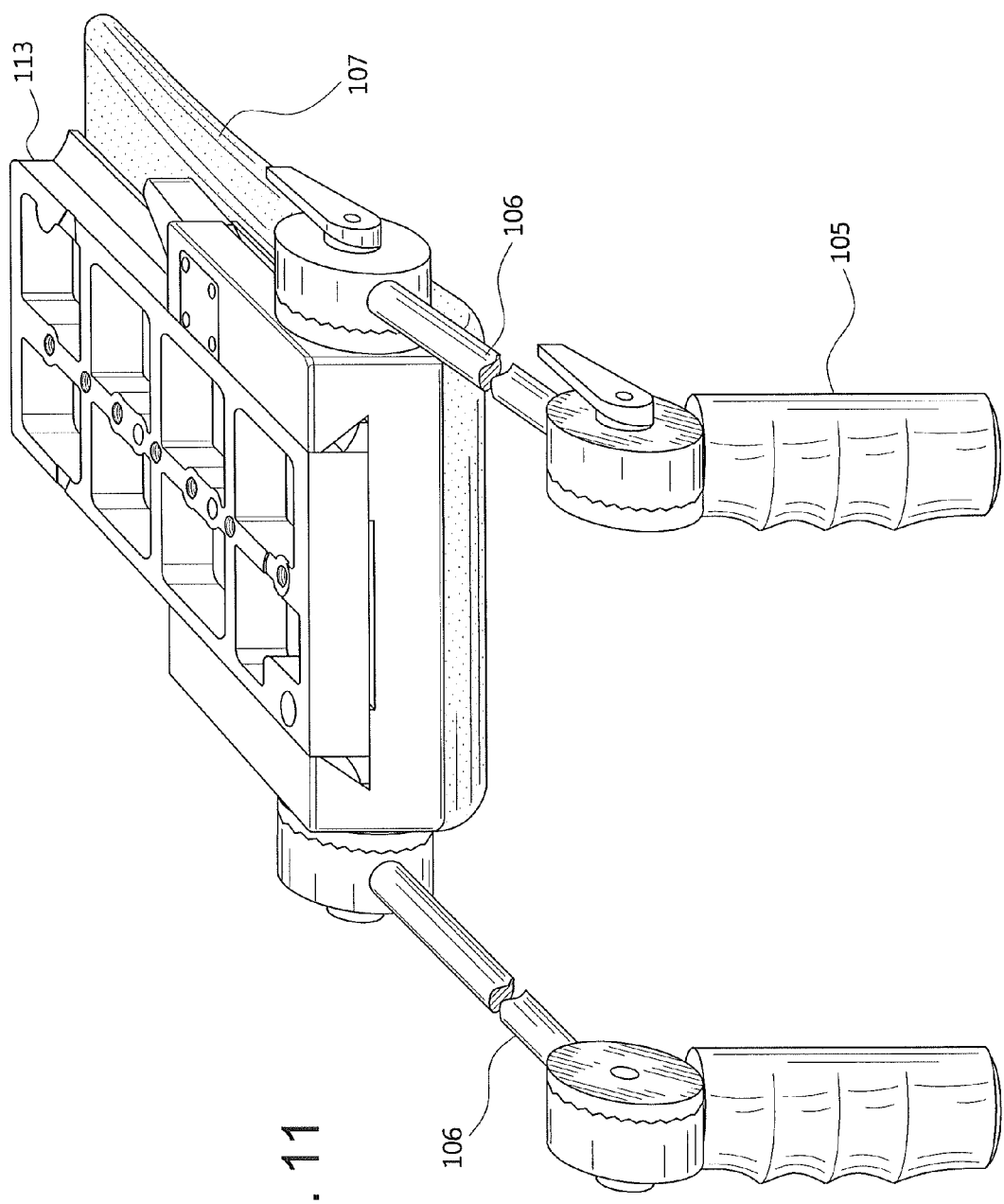
FIG. 11 shows a front perspective view of assembled elements in a quick swap camera system.

FIGS. 9 and 10 show a variation of a camera mount system 101, that is particularly suited for mating with a handheld camera mount 111*b*, as particularly shown in FIG. 15B. This system configuration includes an adapter plate 115, having mounting points 103 for handles 105, such as the type shown in FIGS. 11, 15A, and 15B. The handles 105 are of the type that is commonly used for handheld camera mounts, and thus the mounting points 103 are configured for attachment to the mounting structure 108 shown here and in various other types of commercially available handles. A shoulder pad 107 may be adapted to fit to the bottom side 147 of the adapter plate 115, regardless of the configuration of the bottom side. With two handles 105 affixed to the adapter plate, this configuration enables both left and right shoulder use of the camera during filming.

Figure 12:
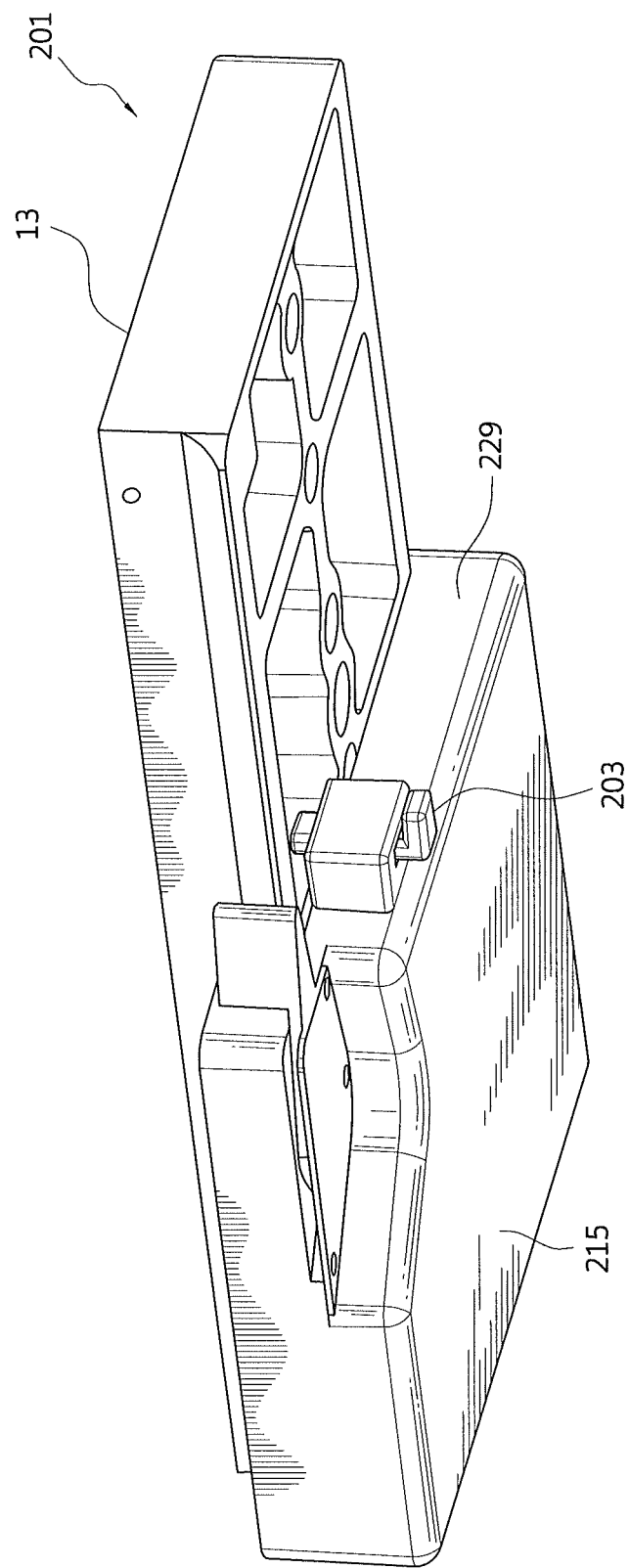
FIG. 12 shows a side perspective view of assembled elements in a quick swap camera mount system.

FIG. 12 shows a variation of a camera mount system 201 for enabling a camera to be quickly swapped between a Steadicam mount and camera mounts sold by ARRI Inc. of Burbank, Calif. The features of the handheld embodiment may also be incorporated into this embodiment. In addition, a second adapter plate (not shown) may be affixed to the bottom of system configurations shown to allow attachment to an ARRI camera mount. Thus, the system can enable quick swapping between any two, three, or four of some of the most commonly used camera mounts. The system may be used with other style camera mounts by either reconfiguration of the bottom side of the adapter plate or by inclusion of a second adapter plate.

The system 201 also includes a safety catch 203 disposed on the first end 229 of the adapter plate 215. This safety catch 203 is preferably spring biased toward the mounting plate 13 so that even if the locking mechanism is not engaged, the mounting plate will not slide out of the adapter plate 215. Such a safety catch may be incorporated into any embodiment of the adapter plate.

While embodiments of this invention have been shown and described, it will be apparent to those skilled in the art that many more modifications are possible without departing from the inventive concepts herein. The invention, therefore, is not to be restricted except in the spirit of the following claims.

The invention claimed is:

1. A camera mount system, comprising:
 an adapter plate, comprising:
  a support platform,
  a primary female alignment element coupled to the support platform, and
  a secondary female alignment element coupled to the support platform, the secondary female alignment element comprising a locking section with a cavity defined therein, the locking section including a locking mechanism fitted partially within the cavity, the locking mechanism comprising a lever, a movable block actuatable by the lever, and a rotary element vertically positioned through an opening in the movable block and coupled to the lever, wherein a top surface of the support platform and profiled surfaces of the female alignment elements form a primary socket and a secondary socket; and
 a camera mounting plate configured to slidably engage with the adapter plate, comprising:
  an outer body portion, having a plurality of sides,
  an inner body portion, having a plurality of quadrants with each quadrant having an opening,
  a primary male alignment element coupled to the outer body portion, and
  a secondary male alignment element coupled to the outer body portion,
 wherein the primary male alignment element is configured to slidably engage with the primary socket and the secondary male alignment element is configured to slidably engage with the secondary socket, and
 wherein when the camera mounting plate engages with the adapter plate, the rotary element is configured to rotate and push the movable block toward the primary socket such that when a force is applied to the lever, moving the lever from a first position to a second position, the movement of the lever and the rotary element causes an interference fit between the block and the camera mounting plate, which locks the camera mounting plate onto the adapter plate.

2. The system of claim 1, wherein the primary male alignment element is configured as a dovetail.

3. The system of claim 1, wherein the secondary male alignment element is configured as a dovetail.

4. The system of claim 1, wherein the primary female alignment element comprises a lateral engagement element disposed therein.

5. The system of claim 1, further comprising a safety catch element disposed on the adapter plate.

6. The system of claim 1, wherein upon assembly of the adapter plate with the mounting plate, as the rotary element turns, the movable block moves downwardly and inwardly toward the mounting plate.

7. The system of claim 6, wherein the adapter plate further comprises an end plate affixed partially over an end of the primary socket.

8. The system of claim 7, wherein the end plate prevents the mounting plate from sliding beyond the end of the primary socket.

9. The system of claim 1, wherein the rotary element is routed through an elongated hole defined in the moveable block.

10. The system of claim 1, further comprising an upper cover plate positioned over the cavity and a lower cover plate adjacent a bottom surface of the rotary element.

11. A camera mount system, comprising:
 an adapter plate, comprising:
  a support platform,
  a primary female alignment element coupled to the support platform, and
  a secondary female alignment element coupled to the support platform, the secondary female alignment element comprising:
   a locking section with a cavity defined therein, the locking section including a locking mechanism fitted partially within the cavity, the locking mechanism comprising a lever, a movable block actuatable by the lever, and a rotary element vertically positioned through an opening in the movable block and coupled to the lever, wherein-at least two top surfaces of the support platform and profiled surfaces of the female alignment elements form a primary socket and a secondary socket, and a first mounting point coupled to an outermost side surface of the primary female alignment element, and a second mounting point coupled to an outermost side surface of the secondary female alignment element; and a camera mounting plate configured to slidably engage with the adapter plate, comprising:

an outer body portion, having a plurality of sides, an inner body portion, having a plurality of quadrants with each quadrant having an opening, a primary male alignment element coupled to the outer body portion, and a secondary male alignment element coupled to the outer body portion, wherein the primary male alignment element is configured to slidably engage with the primary socket and the secondary male alignment element is configured to slidably engage with the secondary socket, and wherein when the camera mounting plate engages with the adapter plate, the rotary element is configured to rotate and push the movable block toward the primary socket such that when a force is applied to the lever, moving the lever from a first position to a second position, the movement of the lever and the rotary element causes an interference fit between the block and the camera mounting plate.

12. The camera mount system of claim 11, further comprising a first handle coupled to the first mounting point and a second handle coupled to the second mounting point.

13. The camera mount system of claim 11, wherein the first mounting point and the second mounting point have profiled outer surfaces for respective engagement with a first handle and a second handle.

14. A handheld camera mount, comprising mounting structure connected to the first mounting point and the second mounting point of the camera mount system of claim 11.

15. The handheld camera mount of claim 14, further comprising a shoulder pad fitted onto a bottom side of the adapter plate.

* * * * *